United States Patent
Suddreth et al.

(10) Patent No.: US 11,694,559 B2
(45) Date of Patent: Jul. 4, 2023

(54) METHODS AND SYSTEMS FOR MODIFYING A FLIGHT PLAN BASED ON FOCUS BOOM DETECTION

(71) Applicant: Honeywell International Inc., Charlotte, NC (US)

(72) Inventors: John Suddreth, Charlotte, NC (US); Daniel E. Lewis, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 57 days.

(21) Appl. No.: 17/226,135

(22) Filed: Apr. 9, 2021

(65) Prior Publication Data
US 2022/0327940 A1 Oct. 13, 2022

(51) Int. Cl.
*G08G 5/00* (2006.01)
*B64C 30/00* (2006.01)

(52) U.S. Cl.
CPC ........... *G08G 5/0039* (2013.01); *B64C 30/00* (2013.01); *G08G 5/006* (2013.01); *G08G 5/0091* (2013.01)

(58) Field of Classification Search
CPC ....... B64C 30/00; G08G 5/006; G08G 5/0091
See application file for complete search history.

(56) References Cited

U.S. PATENT DOCUMENTS

| | | | |
|---|---|---|---|
| 2005/0098681 A1* | 5/2005 | Berson | G08G 5/0052 244/1 N |
| 2019/0164436 A1* | 5/2019 | Suddreth | G06F 30/15 |
| 2022/0057214 A1* | 2/2022 | O'Dell | G08G 5/0039 |

* cited by examiner

*Primary Examiner* — Shon G Foley
(74) *Attorney, Agent, or Firm* — Bookoff McAndrews, PLLC

(57) ABSTRACT

Disclosed are methods, systems, and a non-transitory computer-readable medium for modifying a flight plan of a vehicle. The method may include identifying a maneuver of a flight path that will generate a focus boom, based on received flight path data and permissible threshold boom values for locations along a boom footprint of the maneuver, and generating an adjustment to at least one of a speed, an altitude, an attitude, a location, and a turn radius of the maneuver based on the received data and the permissible threshold boom values. In addition, the method may include updating the flight plan based on the generated adjustment to the at least one of the speed, the altitude, the attitude, the location, and the turn radius of the at least one maneuver.

17 Claims, 7 Drawing Sheets

METHODS AND SYSTEMS FOR MODIFYING A FLIGHT PLAN BASED ON FOCUS BOOM DETECTION

TECHNICAL FIELD

Various embodiments of the present disclosure relate generally to methods and systems for modifying a flight plan of a vehicle based on focus boom detection.

BACKGROUND

Supersonic vehicles, for example, supersonic aircraft, generate a sonic boom when traveling faster than the speed of sound. Factors that influence a strength of a sonic boom include the weight, size, and shape of the vehicle, in addition to the altitude, speed, and flight path of the vehicle, as well as weather and atmospheric conditions. For example, the higher the altitude of the vehicle, the greater the distance the shock waves must travel to reach the ground, which, in turn, reduces an intensity of the sonic boom. The sonic boom forms a boom "carpet" on the ground having a maximum intensity directly beneath the vehicle, if terrain beneath the vehicle is generally flat, or at a closest point to vehicle along terrain beneath vehicle, if terrain beneath the vehicle is not flat, and decreasing as a lateral distance from the flight path increases. Lateral spread of the sonic boom depends upon the altitude, attitude, and speed of the aircraft, as well as the atmosphere. Maneuvers, such as pushovers, acceleration, or "S" turns, of the vehicle may amplify the intensity of the sonic boom, creating a focused sonic boom, also known as a focus boom. In particular, a focus boom occurs when two or more sonic booms arrive at or near the ground (for example, at or between 0 feet and 100 feet of the ground), in the same location at the same time. In addition, geographic features of the ground, such as hills, valleys, and mountains, can reflect shock waves of the sonic boom, which may increase the intensity of the sonic boom.

The shock waves from the sonic booms can cause damage, such as compromised structural stability and shattered glass, to structures that lie within the boom carpet, and generate noise disturbances in areas within the boom carpet. Such damage can be worse when a focus boom is generated. Further, the shock waves from the sonic booms can affect wildlife, startling and alarming animals and causing other short-term and long-term detrimental effects, including, for example, weight reductions, hearing loss, reductions in milk product of dairy cows and goats, decreased appetite in brown shrimp, etc. Therefore, certification authorities, such as the United States Federal Aviation Administration (FAA), prohibit or restrict operation of a civil aircraft at a true flight Mach number greater than 1 over land in the United States, and from a certain distance off shore when a sonic boom could reach U.S. shores. As the FAA considers a range of permissible supersonic operations, however, there is a need to consider how to account for restrictions relating to permissible sonic boom values during operation of the vehicle.

For example, systems controlling supersonic vehicles may need to adjust flight plans to accommodate restrictions, such as minimum, or floor, requirements that dictate a minimum altitude that a vehicle may cruise at supersonic speed, or maximum Mach speed requirements (based on altitude) for a geographic region through which the vehicle is to travel. More specifically, such systems may need to adjust locations, speeds, attitudes, and/or altitudes of maneuvers, including a pushover, a turn, an acceleration, or a climb, in order to avoid generation of a focus boom caused by constructive interference of one or more points along boom footprints of locations along the flight path. In addition or alternatively, such systems may need to adjust locations, speeds, attitudes, and/or altitudes of maneuvers to ensure any generated focus boom occurs within a permitted range or location. And, particularly where the maneuver is a turn, such systems may need to adjust a turn radius in order to avoid generation of a focus boom.

The present disclosure is directed to addressing one or more of these above-referenced needs.

SUMMARY OF THE DISCLOSURE

According to certain aspects of the disclosure, methods and systems are disclosed for modifying a flight plan of a vehicle.

For instance, in one aspect of the disclosure, a method of modifying a flight plan of a vehicle may include receiving speed data, altitude data, attitude data, and flight path data for a flight path of the vehicle, the flight path data including one or more maneuvers to be performed by the vehicle, and corresponding locations, as part of the flight plan, and identifying, using one or more processors, at least one maneuver, of the one or more maneuvers, that will generate a focus boom, based on the received flight path data and permissible threshold boom values for locations along a boom footprint of the at least one maneuver. The method may further include generating, using the one or more processors, an adjustment to at least one of a speed, an altitude, an attitude, a location, and a turn radius of the at least one maneuver based on the received speed data, altitude data, attitude data, and flight path data, and based on the permissible threshold boom values for the locations along the boom footprint of the at least one maneuver. In addition, the method may include updating, using the one or more processors, the flight plan based on the generated adjustment to the at least one of the speed, the altitude, the attitude, the location, and the turn radius of the at least one maneuver.

In another aspect of the disclosure, a system for modifying a flight plan of a vehicle may include a memory storing instructions, and one or more processors executing the instructions to perform a method. The method may include receiving speed data, altitude data, attitude data, and flight path data for a flight path of the vehicle, the flight path data including one or more maneuvers to be performed by the vehicle, and corresponding locations, as part of the flight plan, and identifying at least one maneuver, of the one or more maneuvers, that will generate a focus boom, based on the received flight path data and permissible threshold boom values for locations along a boom footprint of the at least one maneuver. The method may also include generating an adjustment to at least one of a speed, an altitude, an attitude, a location, and a turn radius of the at least one maneuver based on the received speed data, altitude data, and flight path data, and based on the permissible threshold boom values for the locations along the boom footprint of the at least one maneuver. In addition, the method may include updating the flight plan based on the generated adjustment to the at least one of the speed, the altitude, the attitude, the location, and the turn radius of the at least one maneuver.

In still another aspect of the disclosure, a non-transitory computer-readable medium may store instructions that, when executed by one or more processors, cause the one or more processors to perform a method. The method may include receiving speed data, altitude data, attitude data, and flight path data for a flight path of the vehicle, the flight path data including one or more maneuvers to be performed by the vehicle, and corresponding locations, as part of the flight plan, and identifying at least one maneuver, of the one or more maneuvers, that will generate a focus boom, based on the received flight path data and permissible threshold boom values for locations along a boom footprint of the at least one maneuver. The method may also include generating an adjustment to at least one of a speed, an altitude, an attitude, a location, and a turn radius of the at least one maneuver based on the received speed data, altitude data, attitude data, and flight path data, and based on the permissible threshold boom values for the locations along the boom footprint of the at least one maneuver. In addition, the method may include updating the flight plan based on the generated adjustment to the at least one of the speed, the altitude, the attitude, the location, and the turn radius of the at least one maneuver.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

In general, the present disclosure is directed to methods and systems for modifying a flight plan of a vehicle. For instance, a method of the present disclosure may include receiving speed data, altitude data, attitude data, and flight path data for a flight path of the vehicle. The flight path data may include one or more maneuvers to be performed by the vehicle, and corresponding locations for the maneuvers, as part of the flight plan. The method may also include identifying, using one or more processors, at least one maneuver, of the one or more maneuvers, that will generate a focus boom, based on the received flight path data and permissible threshold boom values for locations along a boom footprint of the at least one maneuver, and generating, using the one or more processors, an adjustment to at least one of a speed, an altitude, an attitude, a location, and a turn radius of the at least one maneuver based on the received speed data, altitude data, and flight path data, and based on the permissible threshold boom values for the locations along the boom footprint of the at least one maneuver. In addition, the method may also include updating, using the one or more processors, the flight plan based on the generated adjustment to the at least one of the speed, the altitude, the attitude, the location, and the turn radius of the at least one maneuver.

By virtue of the methods and the related systems disclosed herein, adjustments to locations, speeds, altitudes, attitudes, and turn radii for maneuvers may be quickly and efficiently implemented to update a flight path, in order to minimize or avoid sonic booms generated by such maneuvers, and, more particularly, in order to minimize or avoid focus booms, which may be generated by maneuvers, such as pushovers, acceleration, or "S" turns, of the vehicle may amplify the intensity of the sonic boom, creating a focus boom when two or more sonic booms arrive at or near the ground (for example, at or between 0 feet and 100 feet of the ground), in the same location at the same time.

Figure 1:
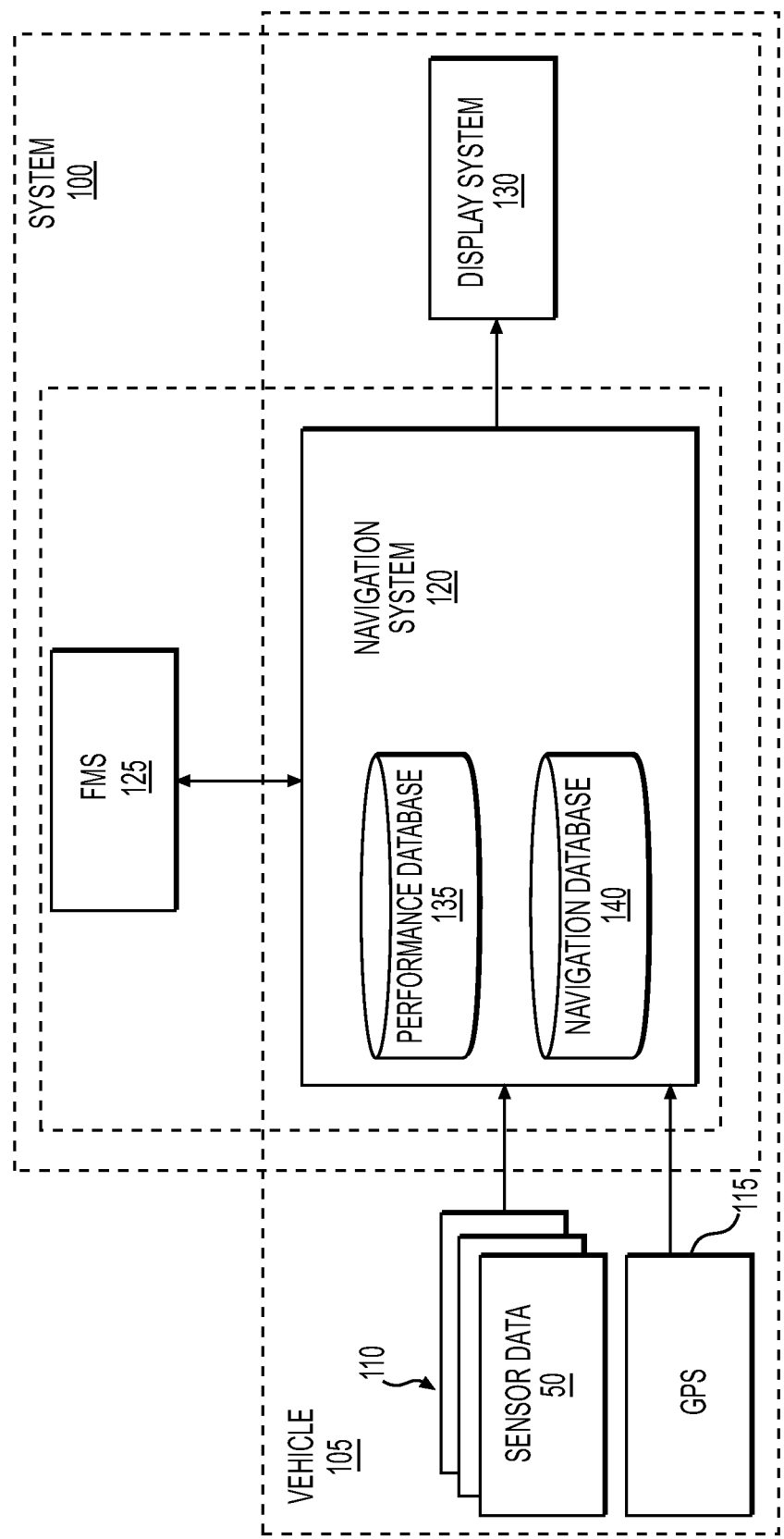
FIG. 1 depicts an exemplary block diagram of a system for modifying a flight plan of a vehicle, according to one or more embodiments.

FIG. 1 depicts an exemplary block diagram of a control system 100 for regenerating at least a portion of a flight plan of a vehicle 105, according to one or more embodiments. The vehicle 105 may be a supersonic aircraft, although the vehicle 105 is not so limited, and may also be a supersonic drone (e.g., an unmanned aircraft), a rocket, a spacecraft, or any other vehicle capable of traveling at supersonic speed. The vehicle 105 may include portions of the control system 100, while other portions of the control system 100 may be off-board of the vehicle 105. The vehicle 105 may also be equipped with one or more sensors 110, including, for example, a speed sensor, an altitude sensor, and a turn radius sensor (e.g., a compass), described in more detail below. In addition, the sensors 110 of the vehicle 105 may include one or more radar(s) and an attitude heading reference system (AHRS). The one or more radar(s) (collectively "radar systems") may obtain radar information, which may include information about local weather and the terrain/ground/objects/obstacles (e.g., aircraft or obstacles and associated locations/movement). The AHRS may include sensors (e.g., three sensors on three axes) to obtain attitude information of the vehicle 105. The attitude information may include roll, pitch, and yaw of the vehicle 105. The vehicle 105 may also be equipped with a Global Positioning System (GPS) antenna 115. The control system 100 includes a navigation system 120, a flight management system (FMS) 125, and a display system 130 (or, generally, a user interface system).

At least the navigation system 120 may be installed within a cockpit of the vehicle 105, for example. As noted, however, other portions of the control system 100, such as the FMS 125, may be on-board or off-board of the vehicle 105, but in communication with the navigation system 120.

The FMS 125 may store a flight plan 200, including a planned flight path 205 (shown in FIGS. 2-5) of the vehicle 105, and may manage the flight plan 200 of the vehicle 105 based on inputs, such as user or system inputs, including inputs from the sensors 110 and inputs from the GPS 115, to thereby control the vehicle 105 as it progresses along the flight plan 200. The FMS 125 may continuously perform calculations along the planned flight path 205, as the vehicle 105 proceeds along or near to the planned flight path 205. In performing these calculations, the FMS 125 may account for a required time of arrival (RTA) of the vehicle 105 to a destination, restricted airspace, weather or atmospheric conditions, air traffic from other aircraft, limitations to ensure passenger comfort, etc. And, with respect to some of the data accounted for by the FMS 125, the FMS 125 may continually (e.g., periodically) update the planned flight path 205 based on this data, such as data relating to weather or atmospheric conditions. The FMS 125 may also update the planned flight path 205 based on changes in data, e.g., changes in the weather or atmospheric conditions, during a flight. In addition, the FMS 125 may use performance data of the vehicle 105, described in more detail below, to determine locations, times, and amounts for transitions, such as an acceleration or a deceleration, along the planned flight path 205. In addition, the FMS 125, as part of the control system 100, may control the vehicle 105 as it proceeds along the planned flight path 205.

The navigation system 120 includes a performance database 135 that stores performance data of the vehicle 105, described in more detail below, and a navigation database 140 that stores the flight plan 200. The navigation system 120 may control navigation of the vehicle 105, based at least in part on the flight plan 200 and calculations performed by the FMS 125, to control the vehicle 105 along the flight path 205, including through maneuvers, such as climbs, descents, accelerations, decelerations, or turns, including, for example, banked turns or "s" turns. A plurality of maneuvers may be programmed into the FMS 125 or the navigation system 120, and stored, for example, in the navigation database 140. The plurality of maneuvers may be designed based on circumstances (e.g., starting altitude, cruising altitude, ending altitude, geographic conditions, weather conditions, etc.) for the route through which the vehicle 105 is to travel, and may further be designed based on specific characteristics of the vehicle 105 (e.g., characteristics of all vehicles of a type similar or same as the vehicle 105, including center of gravity (CG), weight, etc.). The plurality of maneuvers may be included as part of the flight plan 200 (e.g., takeoff, climb, cruise, turns, accelerate, decelerate, descend, landing, etc.). Generally, the plurality of maneuvers may be flight path curves that indicate an altitude, an attitude, and/or a speed, with respect to time, and one or more waypoints of the vehicle 105 through a maneuver. The plurality of maneuvers may be stored in the performance database 135, e.g., with identifiers.

The navigation system 120, in conjunction with the FMS 125, controls actuation systems of the vehicle 105, which may include motors, engines, and/or propellers to generate thrust, lift, and/or directional force for the vehicle 105, and flaps or other control surfaces to augment the thrust, lift, and/or directional force for the vehicle 105, to carry out the plurality of maneuvers of the flight plan 200. The navigation system 120 may collect sensor data 50 from various sensors 110 installed on the vehicle 105, GPS data from the GPS 115, and navigation and performance-related data from external systems connected to the navigation system 120 via a wired and/or a wireless connection. The navigation system 120 may also collect data from the FMS 125, including data received from other vehicles passing through waypoints along the planned flight path 205. The received data may be stored in one or more databases of the navigation system 120, such as the performance database 135 and the navigation database 140, depending on the type of data. For example, in a case in which the vehicle 105 is an aircraft, aerodynamic and engine performance models of the aircraft, maximum take-off weight, fuel weight, and distribution models, CG models and CG thresholds, drag models, and other data relating to the particular aircraft may be stored in the performance database 135. The aerodynamic and engine performance models may include a flight envelope for maneuvers of the vehicle 105, and a prediction model. The information stored in the performance database 135 may be used to predict performance of the vehicle 105 in a maneuver, and, more specifically, to predict a boom value that will be generated when the vehicle 105 performs the maneuver.

The navigation database 140 may store information related to navigation or routing of the vehicle 105 in a geographic area. In particular, the navigation database 140 may contain data elements that indicate restrictions on maneuvers, such as supersonic flight restrictions. The supersonic flight restrictions may indicate three-dimensional zones in which supersonic flight is not allowed, or is allowed but in a limited manner. More specifically, the supersonic flight restrictions may include permissible threshold boom values for waypoints along the planned flight path 205, as well as for locations near the waypoints of the planned flight path 205, and locations along a boom footprint for the waypoints of the planned flight path 205. The permissible threshold boom values indicate, for example, maximum boom values for particular waypoints and/or for the locations along the boom footprints. The information stored in the navigation database 145 may also include, for example, the waypoints, airports, runways, airways, radio navigation aids, holding patterns, etc.

Figure 2:
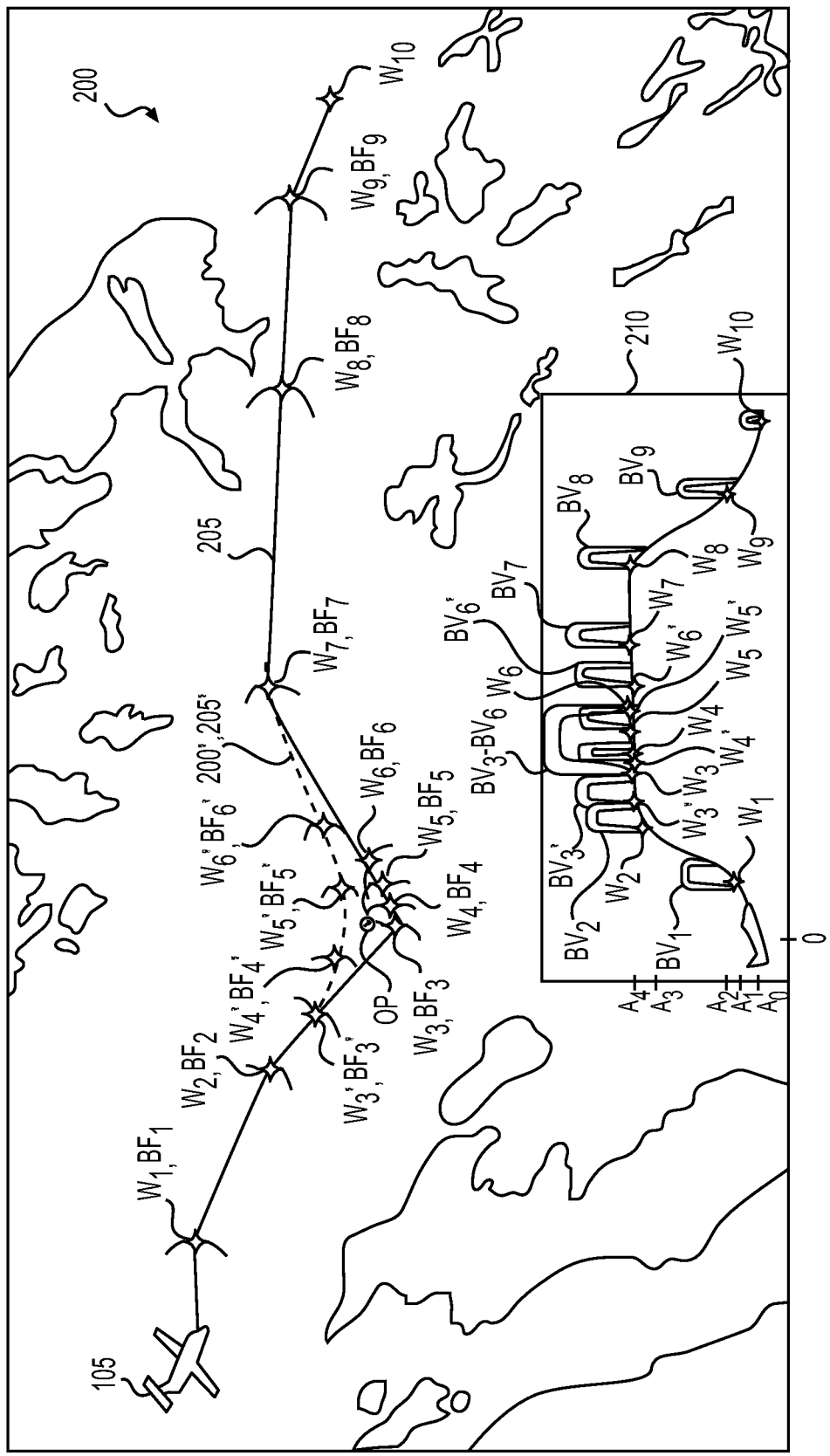
FIG. 2 depicts an exemplary display of a flight plan for a vehicle, including a flight path having maneuvers, and shows boom footprints along the flight path, according to one or more embodiments.

FIG. 2 shows an exemplary display of the flight plan 200 for the vehicle 105, including the flight path 205 having waypoints $W_1$ to $W_{10}$, for example, with some of those waypoints including maneuvers. FIG. 2 also shows boom footprints $BF_1$ to $BF_9$ for the waypoints $W_1$ to $W_9$, respectively, along the flight path 205, according to one or more embodiments. An inset 210 also shows the flight plan 200 for the vehicle 105, including altitudes and boom values $BV_1$ to $BV_9$ for the waypoints $W_1$ to $W_9$, respectively, for the flight path 205. FIG. 2 also shows maneuvers, including climbs at waypoints $W_1$ and $W_2$, descents at waypoints $W_8$ and $W_9$, for example, and turns at waypoints $W_1$, $W_3$ to $W_6$, $W_7$, and $W_9$, for example. The display in FIG. 2 also shows a modified flight path 205' of a modified flight plan 200', including waypoints $W_3'$-$W_6'$, and corresponding adjusted boom values $BV_3'$ to $BV_6'$, as discussed in more detail below.

Figure 3:
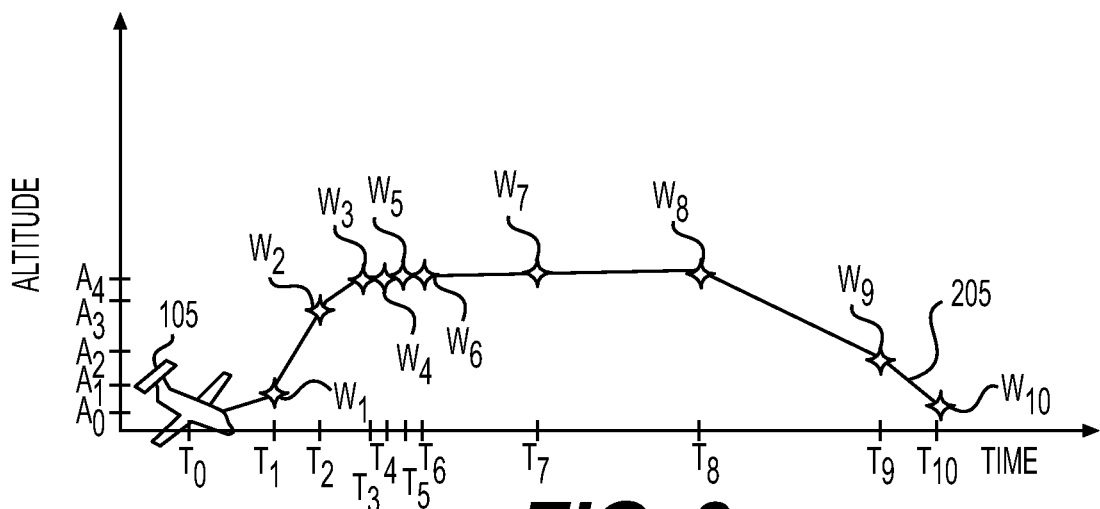
FIG. 3 depicts a graph of time against altitude for an exemplary planned flight path, according to one or more embodiments.
Figure 4:
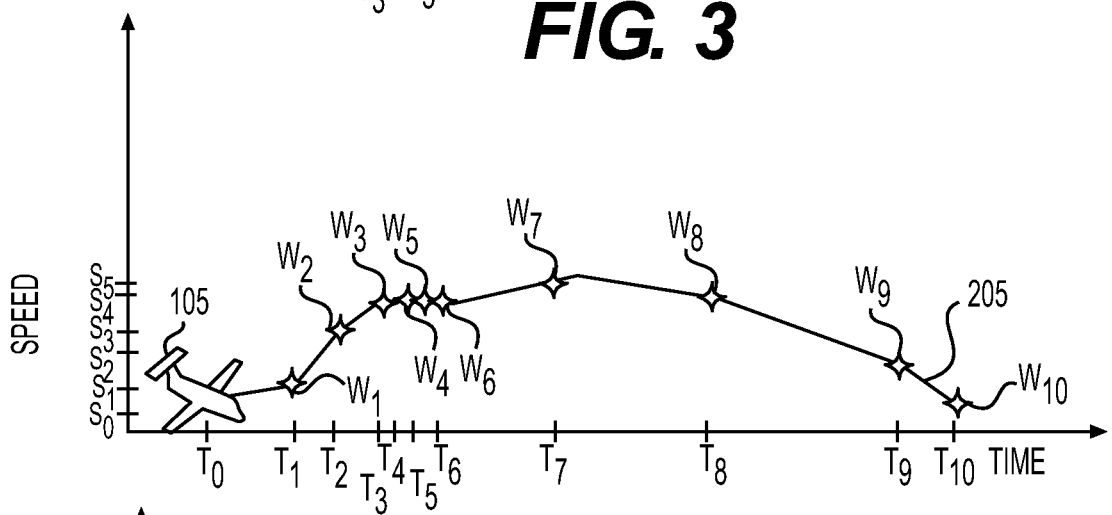
FIG. 4 depicts a graph of time against speed for an exemplary planned flight path, according to one or more embodiments.
Figure 5:
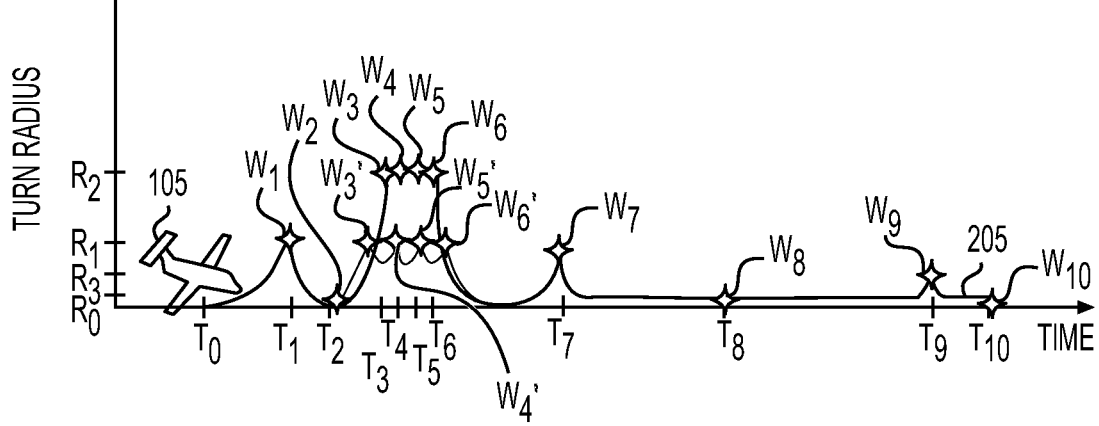
FIG. 5 depicts a graph of time against turn radius for an exemplary planned flight path, according to one or more embodiments.

FIG. 3 shows a graph of time against altitude for the flight path 205 of the flight plan 200. In particular, FIG. 3 shows the altitudes of the vehicle 105 at the waypoints $W_1$ to $W_{10}$ and corresponding times $t_1$ to $t_{10}$, respectively. FIG. 3 also shows maneuvers, including climbs at waypoints $W_1$ and $W_2$, for example, and descents at waypoints $W_8$ and $W_9$, for example. FIG. 4 shows a graph of time against speed for the flight path 205 of the flight plan, and, in particular, shows speeds of the vehicle 105 at the waypoints $W_1$ to $W_{10}$ and corresponding times $t_1$ to $t_{10}$. FIG. 4 also shows maneuvers, including accelerations at waypoints $W_1$, $W_2$, and $W_6$, and decelerations at waypoints $W_7$, WB, and $W_9$, for example. In addition, FIG. 5 shows a graph of time against turn radius for the flight path 205 of the flight plan 200, and, in particular, shows turn radii at the waypoints $W_1$ to $W_{10}$ and corresponding times $t_1$ to $t_{10}$, respectively. FIG. 5 also shows maneuvers, including turn radii at waypoints $W_1$, $W_3$ to $W_7$, and $W_9$, for example, as well as adjusted turn radii at waypoints $W_3'$ to $W_6'$, for example.

Figure 6:
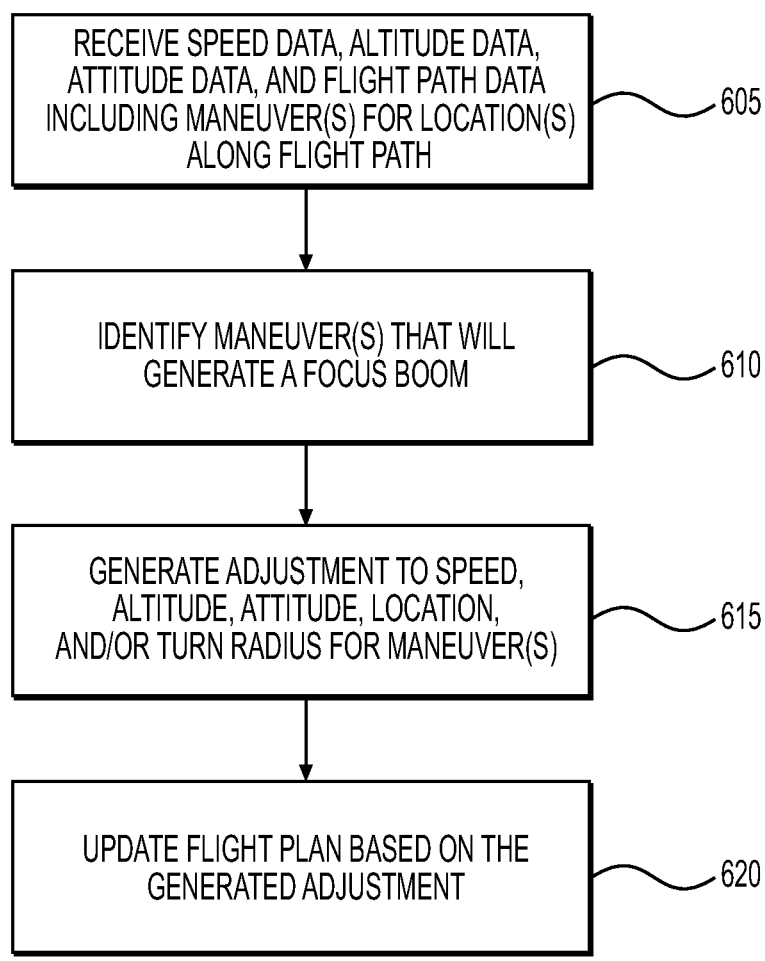
FIG. 6 shows a flowchart for a method for modifying a flight plan of a vehicle, according to one or more embodiments.

With reference to FIG. 6, in one aspect of the disclosure, the control system 100 may perform a method 600 for modifying the flight plan 200 of the vehicle 105 based on speed data, altitude data, attitude data, and flight path data, including one or more maneuvers to be performed by the vehicle 105, and corresponding locations. The method 600 may include a step 605 of receiving speed data, altitude data, attitude data, and flight path data for a flight path 205 of the vehicle 105. As described above, the flight path data may include, at least in part, one or more maneuvers to be performed by the vehicle 105 for the corresponding location (s) along the flight path 205. The method 600 also includes a step 610 of identifying at least one maneuver, of the maneuvers included in the flight path data, that will generate a focus boom, based on the flight path data and permissible threshold boom values for locations along a boom footprint of the at least one maneuver. Then, in step 615, the method 600 includes generating an adjustment to at least one of a speed, an altitude, an attitude, a location, and a turn radius of the at least one identified maneuver. The generating of the adjustment is based on the received speed data, altitude data, attitude data, and flight path data, as well as the permissible threshold boom values for the locations along the boom footprint of the at least one maneuver. And, in step 620, the method 600 includes updating the flight plan 200 based on the generated adjustment to the at least one of the speed, the altitude, the attitude, the location, and the turn radius of the at least one maneuver.

In step 605, the control system 100 receives, or obtains, the speed data, the altitude data, and the attitude data, for example, from the sensor data 50 output by the one or more sensors 110 connected to the control system 100. For example, the control system 100 may receive speed data from a speed sensor of the vehicle 105, altitude data from an altitude sensor of the vehicle, and the attitude data from the AHRS. The flight path data may be retrieved from the navigation database 140, for example. Alternatively, the flight path data may be received from the FMS 125. The flight path data includes data regarding maneuvers to be performed by the vehicle and corresponding locations for those maneuvers. For example, the flight path data includes data for waypoints $W_1$ to $W_{10}$, shown in FIGS. 2-5, including speeds, altitudes, attitudes, turn radii, and locations for those waypoints $W_1$ to $W_{10}$. The flight path data may be received at the beginning of the flight, while the speed data and the altitude data may be continually or periodically requested and received.

In step 610, the control system 100 identifies at least one maneuver, of the maneuvers included the received flight path data, that will generate a focus boom. As noted above, a focus boom may occur due to constructive interference of one or more points along boom footprints of locations along the flight path. In the method 600, the control system 100 identifies a maneuver that will generate a focus boom by analyzing the speeds, altitudes, attitudes, turn radii, and locations of the waypoints $W_1$ to $W_{10}$. For a given pair of sequential waypoints, for example, the control system 100 may determine whether the locations of the waypoints are within a predetermined range of each other. If so, the control system 100 may then evaluate whether any point along a boom footprint of one waypoint intersects or overlaps, in location and time at or near the ground, with any point along a boom footprint of the other waypoint, that is, whether there is an overlap point (OP, shown in FIG. 2, for example, for waypoints $W_3$ and $W_4$). And, if so, the control system 100 may calculate a predicted boom value of the intersection or overlap point (or points of intersection or overlap points, if more than one), using an algorithm, for example, the Cockpit Interactive Sonic Boom Display Avionics (CISBoomDa) algorithm developed by the National Aeronautics and Space Administration (NASA). Then, the control system 100 may compare the predicted boom value of the intersection point to a permissible threshold boom value for that location. The permissible threshold boom value may be retrieved, for example, from the navigation database 140. If the predicted boom value exceeds a permissible threshold boom value of, that is, a threshold boom value indicating focus boom, the control system 100 identifies that intersection point as a focus boom location, and designates the maneuver as a focus boom maneuver. And, if the boom value does not exceed the permissible threshold boom value, the control system 100 proceeds in evaluating all other intersection points between sequential waypoints. The control system then uses any identified maneuvers (i.e., maneuver(s) identified as focus boom maneuver(s)) in subsequent steps.

Step 610 may also include identifying a maneuver that includes one or more of a change in speed that exceeds a threshold speed change amount, a change in altitude that exceeds a threshold altitude change amount, a change in attitude (yaw, pitch, and/or roll) that exceeds a threshold attitude change amount, and a change in turn radius that exceeds a threshold turn radius change amount. More specifically, the control system 100 may proceed with generating an adjustment to one of a speed, an altitude, an attitude (yaw, pitch, and/or roll), a location, and/or a turn radius upon identifying a maneuver for which at least one of a change in speed, a change in altitude, a change in attitude, and a change in turn radius exceeds a corresponding predetermined threshold amount. In this manner, the control system 100 may avoid performing additional processing in assessing each and every change in speed, etc., along the flight path 205, reducing an overall processing time and the need for capacity in a CPU of the control system 100.

In step 615, the control system 100 generates an adjustment to at least one of a speed, an altitude, an attitude, a location, and a turn radius of the maneuver identified in step 610. The control system 100 uses the received speed data and altitude data, as well as the received flight path data and the permissible boom threshold values in generating an adjustment. For example, the control system 100 may use the FMS 125 to calculate an adjustment to a speed at the waypoint of the identified maneuver. In addition or alternatively, the control system 100 may use the FMS 125 to calculate an adjustment to an altitude at the waypoint of the identified maneuver. In addition or alternatively, the control system 100 may use the FMS 125 to calculate an adjustment to an attitude (i.e., pitch, yaw, and/or roll) of the vehicle 105 of the waypoint of the identified maneuver. In addition or alternatively, the control system 100 may use the FMS 125 to calculate an adjustment to a location of the waypoint of the identified maneuver. In addition or alternatively, the control system 100 may use the FMS 125 to calculate an adjustment to a turn radius, if the identified maneuver includes a turn, of the waypoint of the identified maneuver.

The control system 100 may perform the above-noted calculations in a particular order, depending on a preference of an operator of the vehicle or a preference of air traffic control. For example, in a case in which the identified maneuver is a turn, the preferred adjustment may be to widen, that is, increase a turn radius, and, therefore, the control system 100 may first perform the calculation to determine an adjustment to the turn radius for the maneuver. If the calculated adjustment for the turn radius cannot be implemented, for example, due to permissible threshold boom values, the control system 100 may then perform the calculation to determine an adjustment to the location of the maneuver. The control system 100 may, for example, consider locations a predetermined distance from the initial location of the maneuver, such as 2 miles before the initial location, or 2 miles after the initial location, along the flight path 205. The control system 100 may perform the location adjustment calculation repeatedly up to a threshold distance, such as 20 miles before or after the initial location of the maneuver along the flight path 205. If the calculated adjustment to the location does not yield a location having a boom value that is less than a corresponding permissible threshold boom value for the adjusted location, the control system 100 may then proceed to calculate another type of adjustment, such as an adjustment to an altitude of the waypoint of the identified maneuver. If an adjusted altitude having a boom value that is less than a permissible threshold boom value for the location of the waypoint cannot be calculated within a range of, for example, ±10,000 feet of a current altitude of the vehicle 105, then the control system 100 may proceed to calculate still another type of adjustment, such as an adjustment to a speed at the waypoint of the identified maneuver. As with the other calculations, the control system 100 will evaluate an adjusted speed to confirm that a boom value at the waypoint, accounting for the adjusted speed, does not exceed a permissible threshold boom value for the location. Similarly, the control system 100 may calculate an adjustment to an attitude (pitch, yaw, or roll) of the vehicle 105, at the waypoint of the identified maneuver, and, upon determining an adjusted value, the control system 100 may confirm that a boom value at the waypoint does not exceed a permissible threshold boom value for the location.

Upon generation of an adjustment to at least one of the speed, the altitude, the attitude, the location, and/or the turn radius of the identified maneuver, in step 620, the control system 100 then updates the flight plan 200 based on the generated adjustment. That is, the control system 100 replaces the speed data, altitude data, attitude data, location data, and turn radius data, as appropriate, for the waypoint of the identified maneuver, and outputs an updated flight plan 200', shown in FIG. 2, with an updated flight path 205'. The updated flight path 205', for example, may include waypoints $W_3'$ to $W_6'$, each having adjustments to locations and turn radii, as discussed in more detail below.

Generation of the adjustment to the speed, the altitude, the attitude, the location, or the turn radius for the maneuver may further be based on environment data specific to the location of the maneuver, or specific to nearby locations. The environment data may, for example, include data received from the FMS 125, which may, in turn, receive the environment data specific to the one or more locations from other vehicles that have passed through those respective locations within a predetermined amount of time relative to a time at which the vehicle 105 is expected to pass through that location. For example, if another vehicle has passed through a location within 15 minutes of a time when the vehicle 105 is expected to pass through that location, environment data, such as temperature, barometric pressure, wind speed, etc., detected by sensors of the other vehicle, is transmitted to the FMS 125, and then to the navigation system 120 on-board the vehicle 105, so that the navigation system 120 can use the environment data in generating the adjustment to the speed, the altitude, the attitude, the location, or the turn radius of the maneuver. Because boom values depend in part on such environment data, the calculation of boom values in step 610 further incorporates the environment data using the CISBoomDa algorithm noted above. In addition or alternatively, the environment data may include wind speeds, wind directions, barometric pressures, and/or temperature values or profiles, for example, for locations along the flight path. Such data may include one or both of measured data, that is, current and past wind speeds, wind directions, barometric pressures, and/or temperature values or profiles, as well as forecast data, that is, predicted future wind speeds, wind directions, barometric temperatures, and temperature values or profiles for locations along the flight path 205.

For example, with reference to FIGS. 2-5, the control system 100 receives a current speed $S_0$ and a current altitude $A_0$ of the vehicle 105, as well as the flight path data including speeds $S_1$ to $S_5$, altitudes $A_1$ to $A_4$, and corresponding times $t_1$ to $t_{10}$ for waypoints $W_1$ to $W_{10}$, corresponding to maneuvers, along the planned flight path 205. The control system 100 may also receive the environment data, as noted above. In addition, with reference to FIG. 2, the control system 100 receives boom footprints $BF_1$ to $BF_9$ for waypoints $W_1$ to $W_9$ along the flight path 205. Each boom footprint BF is approximately in the shape of a parabola, though boom footprints may be in the shape of a circle, an ellipse, or a hyperbola, as well, and includes a plurality of points Pn. Using this data, the control system 100 identifies at least one maneuver that will generate a focus boom. In the example shown in FIG. 2, the control system considers, for example, sequential waypoints $W_3$ and $W_4$, as waypoints for which locations are within a predetermined range of, for example, 2 miles. Then, the control system 100 evaluates the points along the boom footprints $BF_3$ and $BF_4$ to identify points of intersection. In FIG. 2, for example, an end point of the boom footprint $BF_4$ may intersect a point on boom footprint $BF_3$, as shown. Upon identifying a point of intersection, the control system 100 calculates a predicted boom value of that intersecting point, using the equation noted above. The control system 100 compares the calculated predicted boom value of the intersection point to a permissible threshold boom value for a location corresponding to the intersection point. Then, the control system 100 identifies that intersection point as a focus boom location, and designates the maneuvers at waypoints $W_3$ and $W_4$ as focus boom maneuvers. Alternatively, the waypoints $W_3$ and $W_4$, having locations within the predetermined range of each other, may be considered two waypoints for one maneuver, such as a turn, and the control system 100 would thus identify the turn, including waypoints $W_3$ and $W_4$, as the maneuver that will generate a focus boom. The control system 100 repeats the identifying process for each pair of sequential waypoints along the flight path 205, to yield one or more maneuvers that will generate a focus boom.

Then, in step 615, the control system 100 generates an adjustment to at least one of a speed, an altitude, an attitude, a location, and a turn radius for the identified maneuver. In this example, the adjustment may be to one or both of waypoints $W_3$ and $W_4$, and the adjustment may be, for example, to a turn radius at each of waypoints $W_3$ and $W_4$. The adjustment to the turn radius for waypoint $W_3$ may be calculated using the initial turn radius, speed, altitude, attitude, and location for the waypoint $W_3$, included in the flight path data, as well as the permissible threshold boom value for the location for the waypoint $W_3$, in the equation noted above. In this case, the adjustment to the turn radius for waypoint $W_3$ may be an increase in turn radius. Similarly, the adjustment to the turn radius for waypoint $W_4$ may be calculated using the initial turn radius, speed, altitude, attitude, and location for the waypoint $W_4$, included in the flight path data, as well as the permissible threshold boom value for the location for the waypoint $W_4$, in the equation noted above. In this case, the adjustment to the turn radius for waypoint $W_4$ may be an increase in turn radius. And, as noted above, the control system 100 may confirm that the adjustment to the turn radius can be implemented by comparing the adjusted turn radius for each of the waypoints $W_3$ and $W_4$ to corresponding permissible threshold boom values for the locations of the waypoints $W_3$ and $W_4$.

In this example, if the control system 100 confirms that the adjusted turn radius for waypoints $W_3$ and $W_4$ cannot be implemented without exceeding the threshold boom values for the locations of the waypoints $W_3$ and $W_4$, the control system 100 may then calculate an adjustment to a location for each of waypoints $W_3$ and $W_4$. The adjustment to the location for each waypoint is determined based on the speed data, altitude data, attitude data, and location data for the waypoints $W_3$ and $W_4$, included in the flight path data, and based on a predetermined distance from the initial location for those waypoints $W_3$ and $W_4$, and is calculated for each waypoint using the equation above. In this example, the adjustment to the location for waypoint $W_3$ and the adjustment to the location for waypoint $W_4$ are changes in distance and in direction. The adjusted turn radii and locations for waypoints $W_3$ and $W_4$ are shown in FIG. 2, and the adjusted turn radii for waypoints $W_3$ and $W_4$ are also shown in FIG. 5. In particular, for each of waypoints $W_3$ and $W_4$, the control system 100 generates an adjusted location and an adjusted turn radii, to ensure that the vehicle 105 will not generate a focus boom when performing a maneuver at waypoints $W_3$ and $W_4$.

Then, in step 620, the control system 100 updates the flight plan 200 based on the adjustment to the turn radius and the adjustment to the location for each of waypoints $W_3$ and $W_4$. In particular, the control system replaces the turn radius and the location for waypoints $W_3$ and $W_4$ included in the flight path data with an adjusted turn radius and an adjusted location for these waypoints $W_3$ and $W_4$. The adjusted waypoints $W_3'$ and $W_4'$ constitute part of an updated or adjusted flight plan 200', including an updated or adjusted flight path 205', shown in FIG. 2.

By virtue of the control system 100 performing the steps of the method 600 described above, it is possible to modify or to adjust a flight plan 200 of the vehicle to accommodate restrictions relating to sonic booms, as well as changes, such as changes in environment data, including changes to weather or wind conditions, which could affect boom values along boom footprints for upcoming locations along a flight path 205 of the vehicle 105.

Figure 7:
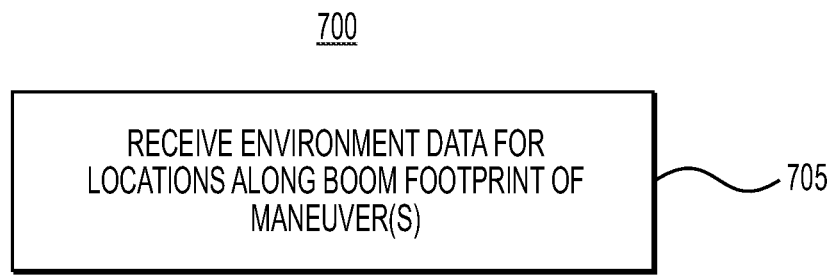
FIG. 7 shows a flowchart for an additional step of the method shown in FIG. 6, including receiving environment data, according to one or more embodiments.

With reference to FIG. 7, in another aspect of the disclosure, the control system 100 may perform the additional step shown in the method 700. In particular, the control system 100 may receive, in step 705, environment data for locations along the boom footprint of waypoints for maneuvers. As noted above, this environment data may be included and accounted for in steps 610 and 615, described above, to identify maneuvers from which a focus boom will be generated, and to generate an adjustment to a speed, an altitude, an attitude, a location, and/or a turn radius for the corresponding waypoint(s). In this case, the CISBoomDa algorithm used in step 610 may be used while incorporating or accounting for the environment data. In addition, in this case, the calculation of the adjustments in step 615 may be further based on the environment data. By virtue of the additional step of the method 700, the control system 100 can account for changes in environment data, to ensure a focus boom will not be generated by virtue of the vehicle 105 performing maneuvers as it proceeds along the flight path 205.

Figure 8:
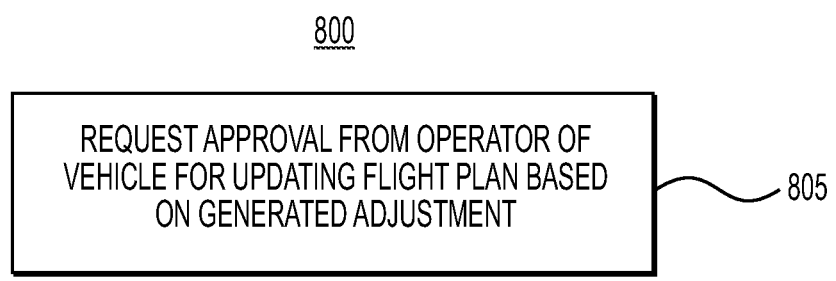
FIG. 8 shows a flowchart for an additional step of the method shown in FIG. 6, including requesting approval from an operator of a vehicle for an update to the flight plan, according to one or more embodiments.

With reference to FIG. 8, in another aspect of the disclosure, the control system 100 may perform the additional step shown in the method 800. In particular, the control system 100 may generate a request 930 in step 805, for authorization for a change in speed, altitude, attitude, location, and/or turn radius, based on the generated adjustment to a speed, an altitude, attitude, a location, and/or a turn radius, respectively. The request 930 may be displayed on a display 900, shown in FIG. 9, of the display system 130, to an operator of the vehicle 105. The display 900 may be configured to receive a selection from an operator, such as "YES," indicating authorization of the change, or "NO," declining authorization of the change. The selection may then be transmitted back to the control system 100 for additional processing, such as performing step 620 to update the flight plan, or to return to step 615, to generate alternative or additional adjustments to the speed, the altitude, the attitude, the location, and/or the turn radius. For example, if the operator declines authorization of a change based on a generated adjustment to an altitude, the control system may repeat step 615, to generate an adjustment to a speed, an attitude, a location, and/or a turn radius, in combination with or instead of the adjustment to the altitude. By virtue of the additional step of the method 800 described above, the operator can be made aware of and can approve changes in speed, altitude, attitude, location, and/or turn radius, eliminating any confusion or surprise on the part of the operator when such adjustments to the flight plan are generated and implemented by the control system 100.

Figure 9:
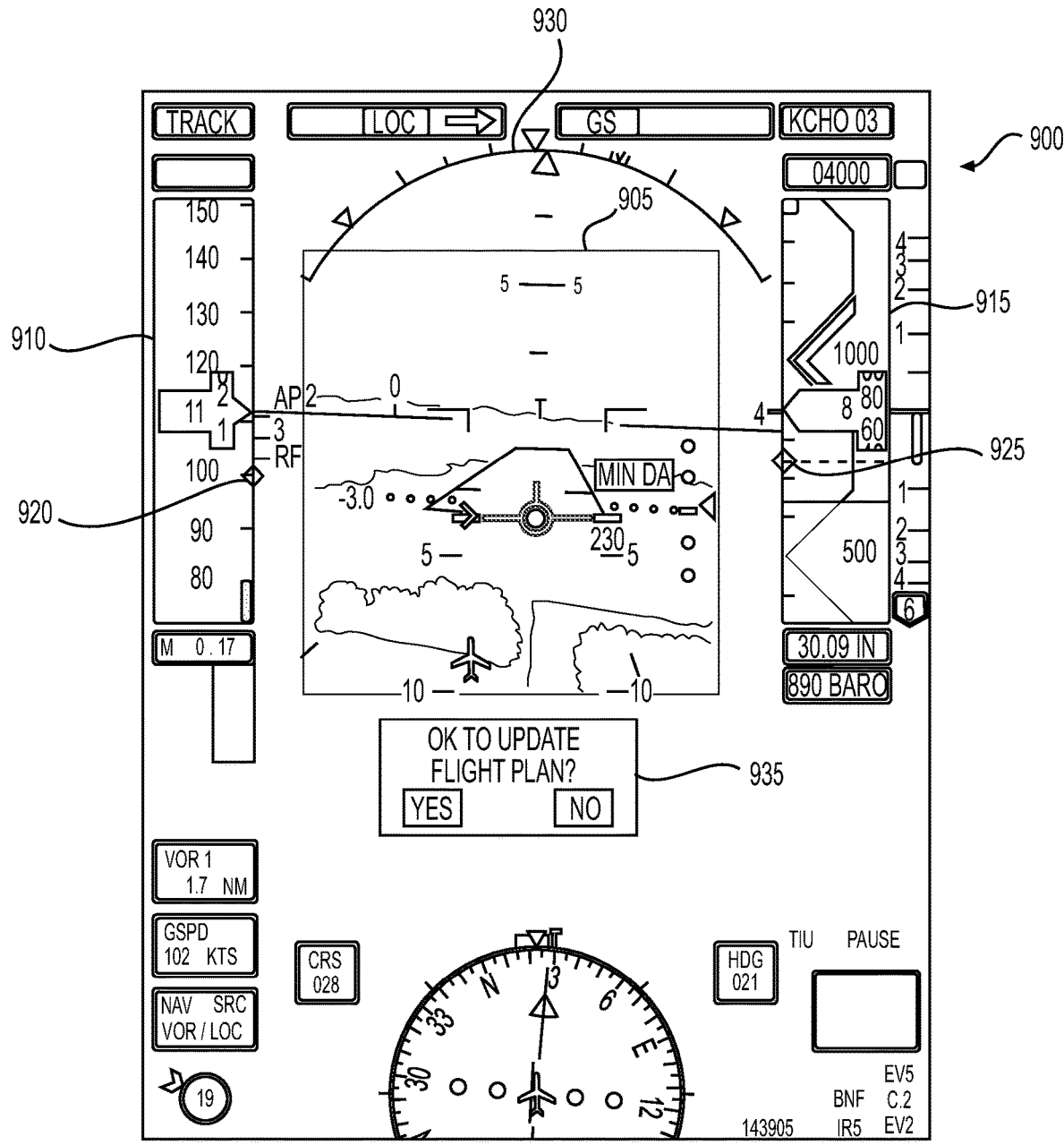
FIG. 9 depicts an example display, including a request for approval from the operator to update the flight plan, as viewed by an operator of a vehicle, according to one or more embodiments.

FIG. 9 depicts an example display as viewed by an operator of a vehicle, according to one or more embodiments. More specifically, FIG. 9 shows a display 900, including a projected forward view 905 of the flight path 205 of the vehicle 105, and an airspeed tape 910 and an altitude tape 915 along the sides of the projected forward view 905. The airspeed tape 910 shows a current speed of the vehicle 105, based on inputs from a speed sensor, and the altitude tape 915 shows a current altitude of the vehicle 105, based on inputs from an altitude sensor of the vehicle 105. The airspeed tape 910 may show, for example, an adjusted speed indicator 920, which indicates an adjusted speed, as determined according to one or more of the methods described above. Alternatively or in addition, the altitude tape 915 may show, for example, an adjusted altitude indicator 925, which indicates the adjusted altitude, as determined according to one or more of the methods described above. The display 900 may also include an attitude indicator 930, here, indicating roll of the vehicle 105, although other indicators for pitch and yaw may also be included. The display 900 may also include a request 935, in the form of a pop-up window overlaid on or near the forward view 905, requesting approval for the adjusted altitude or speed, for example, from the operator.

Figure 10:
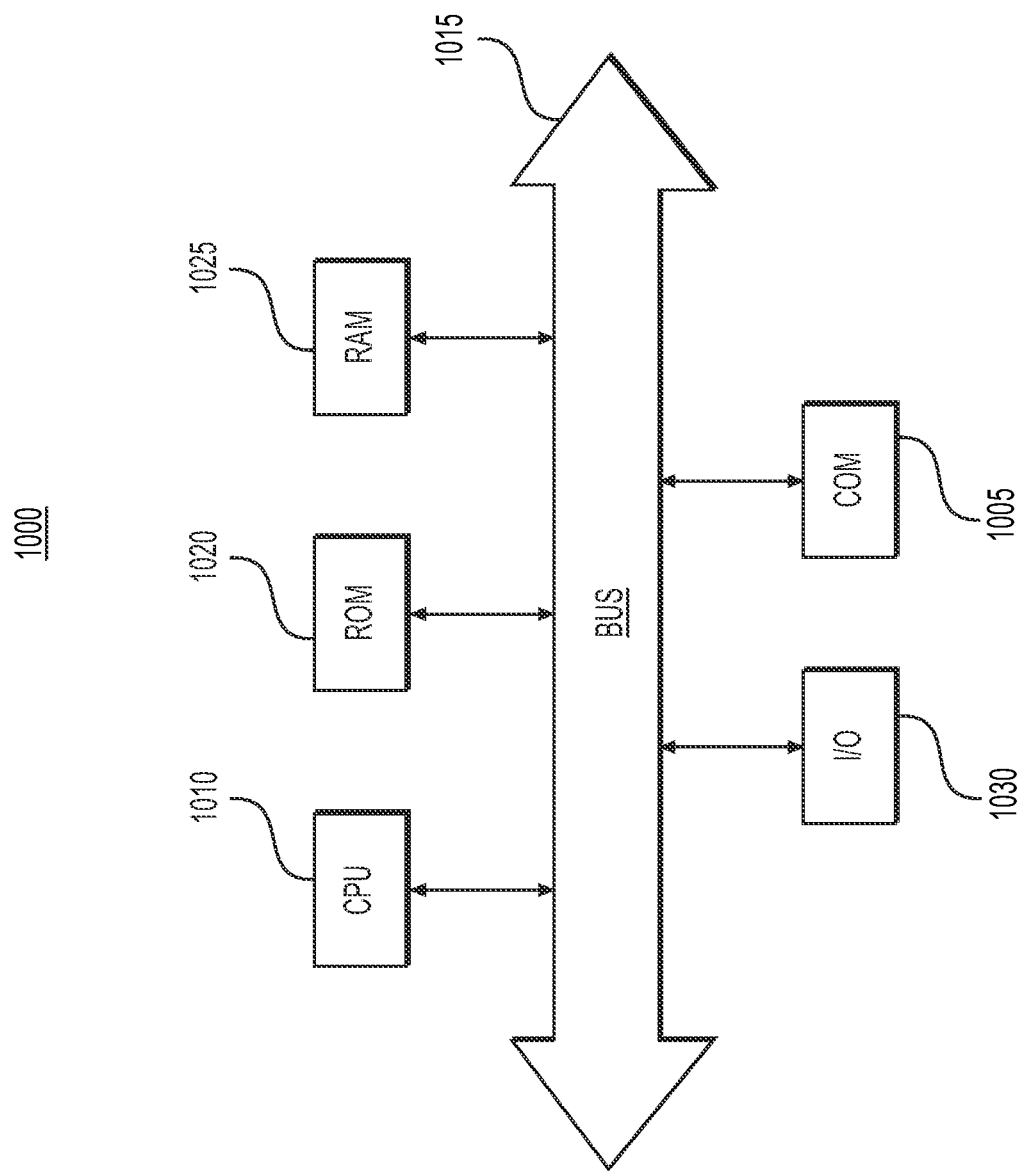
FIG. 10 depicts an example system that may execute techniques presented herein.

FIG. 10 depicts an example system 1000, such as the control system 100, for example, that may execute techniques presented herein. FIG. 10 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1005 for packet data communication. The platform may also include a central processing unit ("CPU") 1010, in the form of one or more processors, for executing program instructions. The platform may include an internal communication bus 1015, and the platform may also include a program storage and/or a data storage for various data files to be processed and/or communicated by the platform, such as a read only memory (ROM) 1020 and a random access memory (RAM) 1025, although the system 1000 may receive programming and data via network communications. The system 1000 also may include input and output (I/O) ports 1030 to connect with input and output devices, such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for modifying a flight plan of a vehicle, the method comprising:
receiving, at a computer control system of the vehicle, speed data, altitude data, attitude data, and flight path data for a flight path of the vehicle, the flight path data including one or more maneuvers to be performed by the vehicle, and corresponding locations, as part of the flight plan;
identifying, using one or more processors of the computer control system, at least one maneuver, of the one or more maneuvers, that will generate a focus boom, based on the received flight path data and permissible threshold boom values for locations along a boom footprint of the at least one maneuver;
receiving, at the computer control system and from another vehicle positioned at an upcoming location along the flight plan that the vehicle is expected to reach within a predetermined period of time, weather-based environment data associated with the upcoming location;
generating, using the one or more processors, an adjustment to at least one of a speed, an altitude, an attitude, a location, and a turn radius of the at least one maneuver based on the received speed data, altitude data, attitude data, and flight path data, and based on the permissible threshold boom values for the locations along the boom footprint of the at least one maneuver, and based on the weather-based environment data, wherein the generating the adjustment comprises generating the adjustment to the at least one of the speed, the altitude, the attitude, the location, and the turns radius sequentially and in a predetermined order;
updating, using the one or more processors, the flight plan based on the generated adjustment to the at least one of the speed, the altitude, the attitude, the location, and the turn radius of the at least one maneuver; and
performing the at least one maneuver according to the updated flight plan.

2. The method of claim 1, wherein the adjustment to the at least one maneuver includes a change to at least one of the speed, the altitude, the attitude, and the location of the at least one maneuver.

3. The method of claim 1, wherein the at least one maneuver is a turn, and the adjustment to the at least one maneuver includes at least an increase in turn radius for the turn.

4. The method of claim 1, wherein the identifying the at least one maneuver that will generate the focus boom includes identifying a maneuver having at least one overlap point between a first boom footprint and a second boom footprint, and identifying a boom value at the at least one overlap point as exceeding a permissible threshold boom value.

5. The method of claim 1, wherein the identifying the at least one maneuver that will generate the focus boom includes identifying a maneuver that includes one or more of a change in speed that exceeds a threshold speed change amount, a change in altitude that exceeds a threshold altitude change amount, a change in attitude that exceeds a threshold attitude change amount, and a change in turn radius that exceeds a threshold turn radius change amount.

6. The method of claim 1, further comprising requesting approval, from an operator of the vehicle, of an update to the flight plan based on the generated adjustment to the at least one of the speed, the altitude, the attitude, the location, and the turn radius of the at least one maneuver.

7. A system for modifying a flight plan of a vehicle, the system comprising:
a memory storing instructions; and
one or more processors executing the instructions to perform a method including:
receiving speed data, altitude data, attitude data, and flight path data for a flight path of the vehicle, the flight path data including one or more maneuvers to be performed by the vehicle, and corresponding locations, as part of the flight plan;
identifying at least one maneuver, of the one or more maneuvers, that will generate a focus boom, based on the received flight path data and permissible threshold boom values for locations along a boom footprint of the at least one maneuver;
receiving, from another vehicle positioned at an upcoming location along the flight plan that the vehicle is expected to reach within a predetermined period of time, weather-based environment data associated with the upcoming location;
generating an adjustment to at least one of a speed, an altitude, an attitude, a location, and a turn radius of the at least one maneuver based on the received speed data, altitude data, attitude data, and flight path data, and based on the permissible threshold boom values for the locations along the boom footprint of the at least one maneuver, and based on the weather-based environment data, wherein the generating the adjustment comprises generating the adjustment to the at least one of the speed, the altitude, the attitude, the location, and the turns radius sequentially and in a predetermined order;
updating the flight plan based on the generated adjustment to the at least one of the speed, the altitude, the attitude, the location, and the turn radius of the at least one maneuver; and
performing the at least one maneuver according to the updated flight plan.

8. The system of claim 7, wherein the adjustment to the at least one maneuver includes a change to at least one of the speed, the altitude, the attitude, and the location of the at least one maneuver.

9. The system of claim 7, wherein the at least one maneuver is a turn, and the adjustment to the at least one maneuver is an increase in turn radius for the turn.

10. The system of claim 7, wherein the identifying the at least one maneuver that will generate the focus boom includes identifying a maneuver having at least one overlap point between a first boom footprint and a second boom footprint, and identifying a boom value at the at least one overlap point as exceeding a permissible threshold boom value.

11. The system of claim 7, wherein the identifying the at least one maneuver that will generate the focus boom includes identifying a maneuver that includes one or more of a change in speed that exceeds a threshold speed change amount, a change in altitude that exceeds a threshold altitude change amount, a change in attitude that exceeds a threshold attitude change amount, and a change in turn radius that exceeds a threshold turn radius change amount.

12. The system of claim 7, wherein the method further comprises requesting approval, from an operator of the vehicle, of an update to the flight plan based on the generated adjustment to the at least one of the speed, the altitude, the attitude, the location, and the turn radius of the at least one maneuver.

13. A non-transitory computer-readable medium storing instructions that, when executed by one or more processors, cause the one or more processors to perform a method for modifying a flight plan of a vehicle, the method comprising:
receiving speed data, altitude data, attitude data, and flight path data for a flight path of the vehicle, the flight path data including one or more maneuvers to be performed by the vehicle, and corresponding locations, as part of the flight plan;
identifying at least one maneuver, of the one or more maneuvers, that will generate a focus boom, based on the received flight path data and permissible threshold boom values for locations along a boom footprint of the at least one maneuver;
receiving, at the computer control system and from another vehicle positioned at an upcoming location along the flight plan that the vehicle is expected to reach within a predetermined period of time, weather-based environment data associated with the upcoming location;
generating an adjustment to at least one of a speed, an altitude, an attitude, a location, and a turn radius of the at least one maneuver based on the received speed data, altitude data, attitude data, and flight path data, and based on the permissible threshold boom values for the locations along the boom footprint of the at least one maneuver, and based on the weather-based environment data, wherein the generating the adjustment comprises generating the adjustment to the at least one of the speed, the altitude, the attitude, the location, and the turns radius sequentially and in a predetermined order;
updating the flight plan based on the generated adjustment to the at least one of the speed, the altitude, the attitude, the location, and the turn radius of the at least one maneuver; and
performing the at least one maneuver according to the updated flight plan.

14. The computer-readable medium of claim 13, wherein the adjustment to the at least one maneuver includes a change to at least one of the speed, the altitude, the attitude, and the location of the at least one maneuver.

15. The computer-readable medium of claim 13, wherein the at least one maneuver is a turn, and the adjustment to the at least one maneuver is an increase in turn radius for the turn.

16. The computer-readable medium of claim 13, wherein the identifying the at least one maneuver that will generate the focus boom includes identifying a maneuver having at least one overlap point between a first boom footprint and a second boom footprint, and identifying a boom value at the at least one overlap point as exceeding a permissible threshold boom value.

17. The computer-readable medium of claim 13, wherein the identifying the at least one maneuver that will generate the focus boom includes identifying a maneuver that includes one or more of a change in speed that exceeds a threshold speed change amount, a change in altitude that exceeds a threshold altitude change amount, a change in attitude that exceeds a threshold attitude change amount, and a change in turn radius that exceeds a threshold turn radius change amount.

* * * * *